United States Patent
Omer et al.

(10) Patent No.: US 11,341,520 B2
(45) Date of Patent: May 24, 2022

(54) METHOD AND SYSTEM TO REDUCE FOOD WASTE AND OPTIMIZE MARKDOWNS AND CONTROL PRICES IN RETAIL

(71) Applicant: WasteLess LTD, Kfar Saba (IL)

(72) Inventors: Oded Omer, Holon (IL); Ben Biron, Kfar Saba (IL); Yossi Regev, Ramat Gan (IL)

(73) Assignee: WASTELESS LTD, Kfar Saba (IL)

( * ) Notice: Subject to any disclaimer, the term of this patent is extended or adjusted under 35 U.S.C. 154(b) by 0 days.

(21) Appl. No.: 17/103,776

(22) Filed: Nov. 24, 2020

(65) Prior Publication Data

US 2021/0081980 A1  Mar. 18, 2021

Related U.S. Application Data

(63) Continuation-in-part of application No. 15/677,262, filed on Aug. 15, 2017, now Pat. No. 10,846,721.

(51) Int. Cl.
*G06Q 30/02* (2012.01)
*G06Q 10/08* (2012.01)
(Continued)

(52) U.S. Cl.
CPC ..... *G06Q 30/0206* (2013.01); *G06F 16/9554* (2019.01); *G06K 7/10297* (2013.01); *G06K 7/10415* (2013.01); *G06K 7/10861* (2013.01); *G06K 7/1413* (2013.01); *G06K 19/06028* (2013.01); *G06K 19/0723* (2013.01);
(Continued)

(58) Field of Classification Search
CPC ............. G06Q 30/0206; G06Q 10/087; G06Q 20/201; G06Q 20/203; G06Q 20/208; G06Q 20/202; G06Q 10/04; G06Q 30/0283; G06K 7/1413; G06K 7/10861; G06K 19/06028; G06K 7/10297; G06K 7/10415; G06K 19/0723; G06K 2007/10504;
(Continued)

(56) References Cited

U.S. PATENT DOCUMENTS

2019/0102788 A1* 4/2019 Lewis ................ G06Q 30/0206

FOREIGN PATENT DOCUMENTS

WO    WO-9612243 A1 * 4/1996 ......... G06K 7/10881

OTHER PUBLICATIONS

Jawad Khan, What Is Dynamic Pricing & How Does It Affect Ecommerce?, 2015 (Year: 2015).*

* cited by examiner

*Primary Examiner* — Tarek Elchanti
(74) *Attorney, Agent, or Firm* — Gearhart Law LLC; David Postolski, Esq.

(57) ABSTRACT

Systems for determining a price of goods, reducing food waste, optimizing markdowns for the goods, and controlling prices of the goods in a retail setting are described. A scanner scans a readable identification tag affixed to a good during a time period. A pricing engine of at least one server queries, dynamically and in real-time, a database to identify, from the readable identification tag, the good and the information associated with the good. The pricing engine then applies algorithms to the identified good to calculate a price of the good and modify the calculated price of the good during the time period to optimize a target function. The optimization of the target function depends on price-calculation factors associated with a shelf-state of the good and associated with a future stock of the good. At least one calculated price based on the expiration date of the good is displayed.

21 Claims, 4 Drawing Sheets

(51) Int. Cl.
*G06Q 20/20* (2012.01)
*G06K 7/14* (2006.01)
*G06K 7/10* (2006.01)
*G06K 19/06* (2006.01)
*G06K 19/07* (2006.01)
*G06F 16/955* (2019.01)
*G06N 20/00* (2019.01)
*G06Q 10/04* (2012.01)

(52) U.S. Cl.
CPC ............. *G06N 20/00* (2019.01); *G06Q 10/04* (2013.01); *G06Q 10/087* (2013.01); *G06Q 20/201* (2013.01); *G06Q 20/202* (2013.01); *G06Q 20/203* (2013.01); *G06Q 20/208* (2013.01); *G06K 2007/10504* (2013.01)

(58) Field of Classification Search
CPC .. G06F 16/9554; G06N 20/00; G06N 3/0454; G07G 1/0081; G07G 1/0045; G07F 9/026
USPC ........................................................ 705/7.35
See application file for complete search history.

METHOD AND SYSTEM TO REDUCE FOOD WASTE AND OPTIMIZE MARKDOWNS AND CONTROL PRICES IN RETAIL

CROSS-REFERENCE TO RELATED APPLICATIONS

This application is a U.S. Continuation-in-Part (CIP) Non-Provisional Patent Application that claims priority to U.S. Non-Provisional patent application Ser. No. 15/677,262, filed on Aug. 15, 2017, the contents of which are hereby fully incorporated by reference.

FIELD OF THE EMBODIMENTS

The field of the invention and its embodiments relate to price and markdown calculation of goods and, in particular, to dynamic pricing of goods according to one or more price-calculation factors and/or to dynamic markdowns or pricing of goods using machine learning algorithms.

BACKGROUND OF THE EMBODIMENTS

Food spoilage is a major problem in the grocery industry. Billions of dollars of merchandise is lost every year to do expired food not being sold. Given the choice to pay the same price for goods having longer shelf lives and goods about to expire, consumers are less likely to purchase the goods about to expire. This results in many items not getting sold, leading to many items being thrown away. Therefore, a method of dynamic pricing and automatic and dynamic markdown system for grocery items is needed to help increase the revenues from sales and better sales price and reduce waste.

REVIEW OF RELATED TECHNOLOGY

U.S. Pat. No. 5,483,624 generally describes a hand held labeler is programmable to operate in accordance with a sequence of commands forming an application program that is downloaded to the labeler and stored in a random access memory. Each command is associated with a command routine selected from a set of command routines that is stored in a read only memory. The commands of the application program and associated command routines are executed by a microprocessor of the labeler to perform flexible data collection, data manipulation and label printing operations.

U.S. Patent Publication No. 2007/0075832 generally describes a user-programmable (UP) component for an RFID reader. The UP component facilitates reading an RFID tag and interfacing to I/O that functions as a validation mechanism that the read operation has occurred. The UP component facilitates application of the reader to new and/or different systems and products. The UP component can be a separate external device or module that interfaces to the RFID reader, or can be integrated into the reader for operation therein.

U.S. Patent Publication No. 2007/0023516 generally describes an RFID tag is pre-programmed with information about an object or device used in an RFID printer system. The RFID printer system can then read this information and take the appropriate action, such as user notification or printer parameter adjustment, to improve printer performance. The RFID tag can contain information about and be attached to printer elements, such as an RFID label or roll of labels, a print head, or a printer ribbon.

Various methods exist for calculating a price of a good. However, their means of operation are substantially different from the present disclosure, as the other inventions fail to solve all the problems taught by the present disclosure.

SUMMARY OF THE EMBODIMENTS

A first embodiment of the present invention describes a system for optimizing pricing of goods to achieve greater revenue while reducing waste in a retail setting. The system includes a good, a readable identification tag affixed to the good, at least one server, a scanner, a display, and a point-of-sale (POS) terminal. The readable identification tag is a Radio-Frequency Identification (RFID) tag, a barcode, a matrix barcode, and/or a data-enabled barcode. In some examples, the display is an electronic shelf-label, a screen affixed to an entire width of a shelf, a display of a mobile device, a sticker, or a display associated with the POS terminal.

At least one server includes a memory, a processor, a database, and a dynamic pricing engine. It should be appreciated that each component may be deployed on a separate server, in examples. The dynamic pricing engine includes one or more algorithms, such as: a reinforcement learning algorithm, a deep learning algorithm, a machine learning algorithm, and/or a classic optimization algorithm, among others. The database is configured to store information associated with the good.

Specifically, the information includes one or more price-calculation factors associated with a shelf-state of the good and one or more price-calculation factors associated with a future stock of the good. These factors may include: at least one expiration date of the good, a quantity of similar goods, a sale strength of a brand of goods, a catalog price listed for the good, a predetermined minimum price allowed for the good, a demographic area in which the good is sold, a day of the week in which the good is sold, an hour of the day in which the good is sold, a demand curve for the good, a system model for the good, whether the good is discounted, whether the good is packaged, whether the good has any competitors, the last price that was charged for the good, whether there is an active advertising campaign for the good, or a price history of the good, among others.

In some examples, the scanner is a barcode scanner connected to the POS terminal in the store, where the POS terminal is connected to the at least one server. In this scenario, the barcode scanner is configured to: scan the readable identification tag affixed to the good during a time period (e.g., a first time period). In other examples, the scanner may be part of an application executed by a computing device. In this scenario, the scanner may scan the readable identification tag affixed to the good during the time period. It should be appreciated that the scanner is not limited to the examples described herein and may be any other scanner that can read any labeling method.

Next, the dynamic pricing engine configured to: query, dynamically and in real-time, the database to identify, from the readable identification tag, the good and the information associated with the good. As explained, the information associated with the good includes the one or more price-calculation factors associated with the shelf-state of the good and the one or more price-calculation factors associated with the future stock of the good. Moreover, it should be appreciated that any transaction related to the good triggers the dynamic pricing engine.

Then, the dynamic pricing engine is configured to: apply the one or more algorithms to the identified good to calculate a price (e.g., a first price) of the good. The dynamic pricing engine also modifies the calculated price of the good during the time period to optimize a target function. The optimization of the target function depends on the one or more price-calculation factors associated with the shelf-state of the good and the one or more price-calculation factors associated with the future stock of the good.

The at least one server is then further configured to: transmit at least one calculated price of the good to a system managing one or more displays in real-time such that the pricing per good that is transmitted to the POS is aligned with the prices shown on the displays for the same good. Such system may include a display server, where the at least one calculated price of the good is based on the expiration date of the good. In some examples, the at least one server also transmits a non-discounted price of the good and/or additional pricing for the good based on other expiration dates of the good to the system. In preferred examples, the at least one server is configured to transmit, dynamically and in real-time, different pricing for the good based on the expiration date as defined by the one or more algorithms.

In another preferred example, the at least one server is configured to present two prices for the good. When the readable identification tag is scanned, the pricing associated with the closer expiration date may be only presented via the display.

The time period is a first time period and the calculated price of the good is a first price of the good. The at least one server is also configured to apply the one or more algorithms to the identified good to: calculate a second price of the good during a second time period and modify the calculated second price of the good during the second time period to optimize the target function. The optimization of the target function depends on the one or more price-calculation factors associated with the shelf-state of the good and the one or more price-calculation factors associated with the future stock of the good.

In a first example, the first price of the good is greater than the second price of the good since the second time period is closer to an expiration date of the good than the first time period. In a second example, the second price of the good is greater than the first price of the good, even though the second time period is further from the expiration date of the good than the first time period. This second example may occur when the system described herein reduced the price of the good that expires soon (e.g., tomorrow), and after such reduction, the store replenished the good with a fresh good.

A second embodiment of the present invention describes a system for optimizing pricing of goods to achieve greater revenue while reducing waste in a retail setting. The system includes: a good, a readable identification tag affixed to a good, at least one pricing server, and a scanner. In some examples, the at least one pricing server is a virtual server or a cloud server. In other examples, the at least one pricing server is located in-store, in a POS datacenter, and/or in a retail datacenter.

The at least one pricing server includes: a dynamic pricing engine comprising one or more algorithms, a memory, a processor, and a database configured to store information associated with the good. The information associated with the good comprises one or more price-calculation factors associated with a shelf-state of the good and one or more price-calculation factors associated with a future stock of the good. Each of the one or more algorithms may be a reinforcement learning algorithm, a deep learning algorithm, a machine learning algorithm, or a classic optimization algorithm. The reinforcement learning algorithm depends on a simulated environment. Further, the reinforcement learning algorithm is selected from a group consisting of: a Q-learning algorithm and a genetic algorithm.

In some examples, as explained supra, the scanner is the barcode scanner. In this example, the barcode scanner is connected to the POS terminal in the store. The POS terminal is connected to the at least one pricing server. Further, the barcode scanner is configured to scan the readable identification tag affixed to the good during a time period. In response, the at least one pricing server is configured to: query, dynamically and in real-time, the database to identify, from the readable identification tag, the good and the information associated with the good. Then, the at least one pricing server is configured to: apply the one or more algorithms to the identified good to: calculate a price of the good; and modify the calculated price of the good during the time period to optimize a target function.

The optimization of the target function depends on the one or more price-calculation factors associated with the shelf-state of the good and the one or more price-calculation factors associated with the future stock of the good. Specifically, it should be appreciated that the target function is based on factors such as: waste associated with the good during the time period, revenue associated with the good during the time period, waste associated with the good and other goods during the time period, revenue associated with the good and other goods during the time period, and/or marginal profits associated with the good during the time period, among others.

The at least one pricing server then transmits at least one calculated price of the good to a system managing one or more displays in real-time such that the pricing per good that is transmitted to the POS is aligned with the prices shown on the displays for the same good. Such system may include a display server, where the at least one calculated price of the good is based on the expiration date of the good. In some examples, the at least one pricing server also transmits a non-discounted price of the good and/or additional pricing for the good based on other expiration dates of the good to the system. In preferred examples, the at least one pricing server is configured to transmit, dynamically and in real-time, different pricing for the good based on the expiration date as defined by the one or more algorithms.

In another preferred example, the at least one pricing server is configured to present two prices for the good. When the readable identification tag is scanned, the pricing associated with the closer expiration date may be only presented via the display. The display is an electronic shelf-label, a screen affixed to an entire width of a shelf, a graphical user interface/display of a mobile device, a sticker, and/or a display associated with the POS terminal.

A third embodiment of the present invention describes a method for optimizing pricing of goods to achieve greater revenue while reducing waste in a retail setting. The method includes numerous process steps, such as: scanning, via a barcode scanner connected to a point-of-sale (POS) terminal in a store, the POS terminal being connected to at least one pricing server, a readable identification tag affixed to a good during a time period. The method then includes: querying, dynamically and in real-time by the at least one pricing server, a database of the at least one pricing server to identify, from the readable identification tag, the good and the information associated with the good. The information includes one or more price-calculation factors associated with a shelf-state of the good and one or more price-calculation factors associated with a future stock of the good.

Next, the method includes applying, by a dynamic pricing engine of the at least one pricing server, one or more algorithms to the identified good to: calculate a price of the good; and modify the calculated price of the good during the time period to optimize a target function. The optimization depends on the one or more price-calculation factors associated with the shelf-state of the good and the one or more price-calculation factors associated with the future stock of the good.

Then, the method includes: transmitting, by the at least one pricing server, at least one calculated price of the good to a system managing one or more displays in real-time such that the pricing per good that is transmitted to the POS is aligned with the prices shown on the displays for the same good. Such system may include a display server, where the at least one calculated price of the good is based on the expiration date of the good. In some examples, the at least one pricing server also transmits a non-discounted price of the good and/or additional pricing for the good based on other expiration dates of the good to the system. In preferred examples, the at least one pricing server is configured to transmit, dynamically and in real-time, different pricing for the good based on the expiration date as defined by the one or more algorithms.

In another preferred example, the at least one pricing server is configured to present two prices for the good. When the readable identification tag is scanned, the pricing associated with the closer expiration date may be only presented via the display. The display is an electronic shelf-label, a screen affixed to an entire width of a shelf, a graphical user interface/display of a mobile device, a sticker, and/or a display associated with the POS terminal.

The method may also include: calculating, by the at least one pricing server, a second price of the good during a second time period and modifying, by the at least one pricing server, the second price of the good to optimize the target function. The optimization of the target function depends on the one or more price-calculation factors associated with the shelf-state of the good and the one or more price-calculation factors associated with the future stock of the good.

In some examples, the first price of the good is greater than the second price of the good, where the second time period is closer to an expiration date of the good than the first time period. In other examples, the second price of the good is greater than the first price of the good, even though the second time period is closer to an expiration date of the good than the first time period.

It should be appreciated that the calculations described herein with reference to the first, second, and third embodiment occur continuously and iteratively in the background. According to such process, the dynamic pricing engine collects, fetches, calculates, stores, analyzes, and executes various operations to support the goal to set the optimal price for the good at any point in time since different datasets are continuously streamed to the dynamic pricing engine sporadically or at irregular intervals. These datasets may include, but are not limited to: seel-in/inventory datasets, sellout/sales datasets, weather datasets, and/or promotion datasets, among others.

As such, when the readable identification tag is scanned, as described above, the pricing for the good associated with the readable identification tag is already set and has been previously defined. As such, the calculation of the pricing of the good is not a single operation that is executed during customer checkout.

In general, the present invention succeeds in conferring the following benefits and objectives.

It is an object of the present invention to employ a dynamic pricing engine to reduce food waste and optimize store revenue.

It is an object of the present invention to employ a dynamic pricing engine that uses branches of machine learning to reduce food waste and optimize store revenue.

DESCRIPTION OF THE PREFERRED EMBODIMENTS

Figure 1:
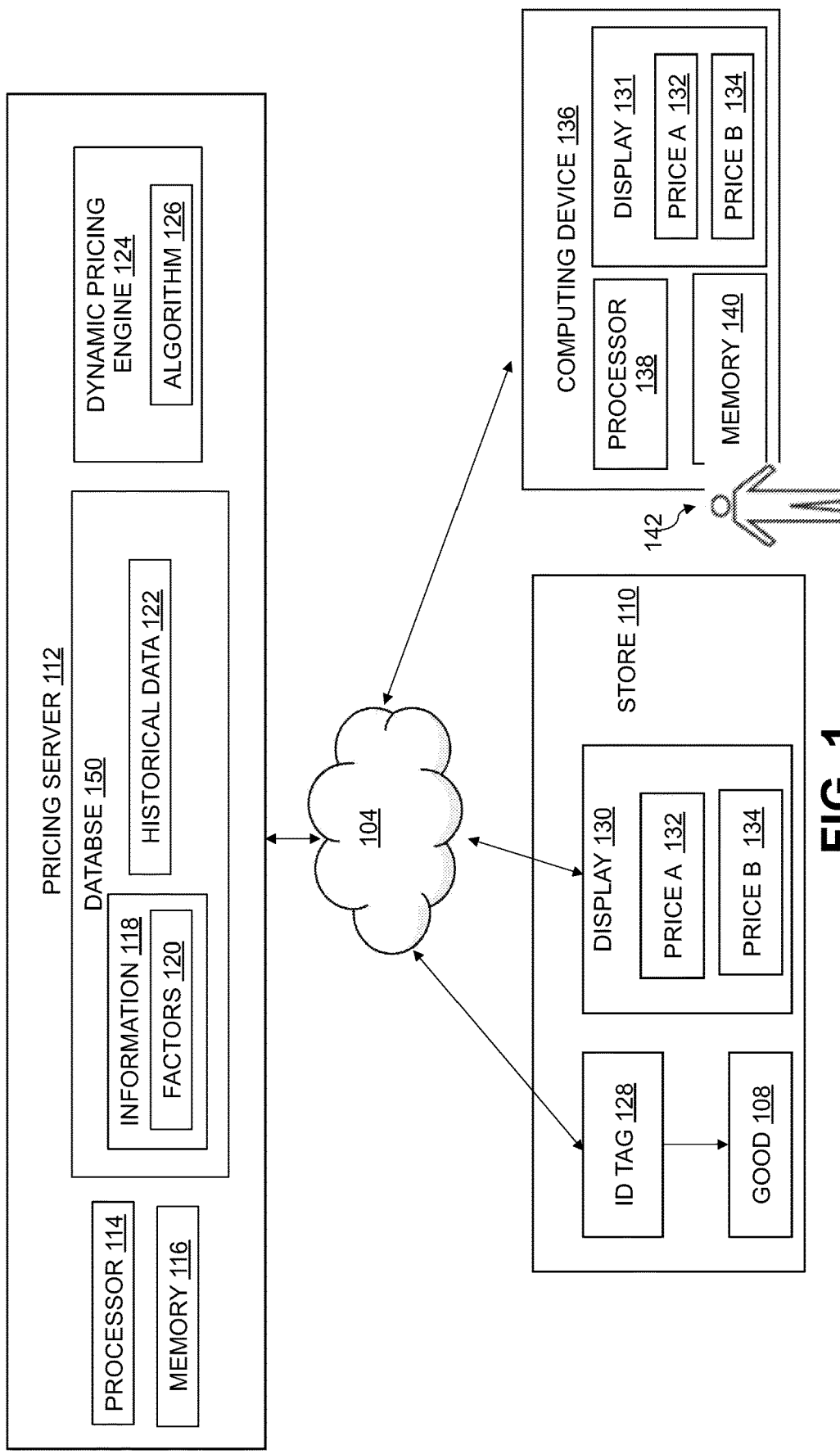
FIG. 1 and FIG. 2 depict block diagrams of a system, according to at least some embodiments disclosed herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
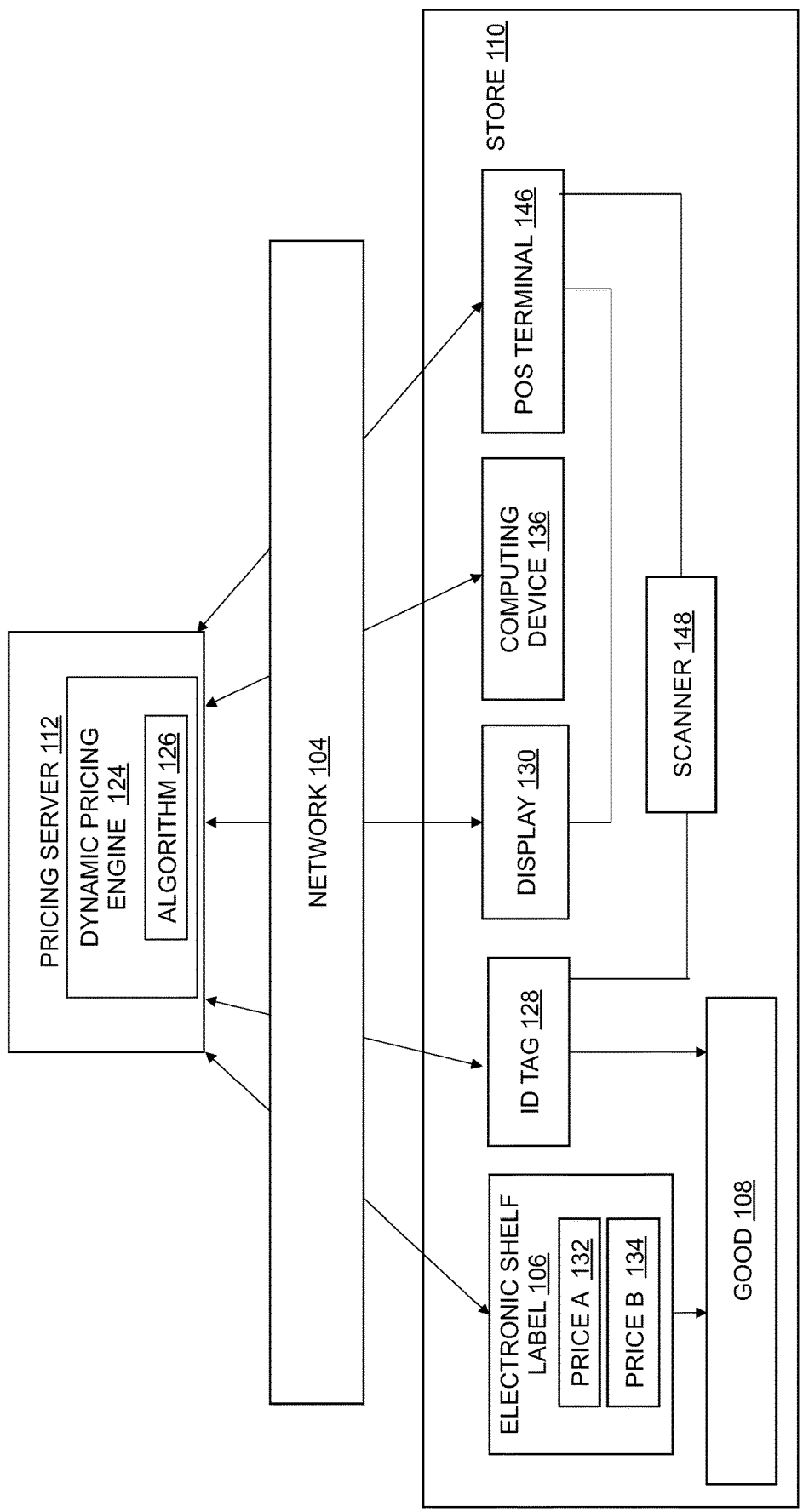

A system is described and depicted in at least FIG. 1 and FIG. 2 herein. The system of FIG. 1 and FIG. 2 includes a pricing server 112. It should be appreciated that more than one server may be used in the system described herein, in examples. As depicted, the pricing server 112 may include a processor 114, a memory 116, a database 150, and a dynamic pricing engine 124. Moreover, in other examples, the pricing server 112 may be a computing device such that the computing device comprises the processor 114, the memory 116, a display 130, the database 150, and the dynamic pricing engine 124. It should be appreciated that the pricing server 112 may be a virtual server or a cloud server. Moreover, the pricing server 112 may be located in a store 110 or in a POS datacenter (not shown).

As depicted, the database 150 of the pricing server 112 may store information 118 associated with a good 108 offered for sale in the store 110 (such as a grocery store), as well as historical data 122. In some examples, the information 118 of the database 150 may include a good's catalog or SKU number, a manufacturer's suggested expiration date of the good 108, a "best used before" date of the good 108, a sell-by date, any date indicator of product freshness, one or more price-calculation factors 120 associated with a shelf-state of the good 108, one or more price-calculation factors 120 associated with a future stock of the good 108, a name of the good 108, a location of the good 108, and/or any other relevant information. It should be appreciated that the one or more price-calculation factors 120 of the database 150 may be updated dynamically and in real-time.

The historical data 122 may include historical information associated with the good 108, historical information associated with other goods in the store 110, and/or other parameters associated with the store 110. The database 150 may be local or remote. In further examples, the dynamic pricing engine 124 may comprise one or more algorithms 126. It should be appreciated that the one or more algorithms 126 may be used as dynamic pricing algorithms to reduce food waste and optimize store revenue by employing branches of machine learning, which will be discussed further herein.

Further, a readable identification tag 128 may be affixed to the good 108. The readable identification tag 128 may be a Radio-Frequency Identification (RFID) tag, a barcode, a matrix barcode, and/or any data-enabled barcode, among others not explicitly listed herein. Further, the store 110 may include numerous electronic shelf labels associated with the goods, such as an electronic shelf label 106, the display 130, a screen affixed to an entire width of a shelf associated with the good 108, etc.

As described herein, any of these displays (e.g., the electronic shelf label 106 associated with the good 108, the display 130, and/or the screen affixed to the entire width of the shelf associated with the good 108) may be used by retailers for displaying product pricing. The product pricing are automatically updated whenever a price is changed from a central control server, such as the pricing server 112. Typically, electronic display modules are attached to the front edge of retail shelving.

The store 110 may also include a barcode scanner 148 that is connected to a POS terminal 146. The display 130 may be affixed to the POS terminal 146. The barcode scanner 148 and the display 130 may be affixed to the POS terminal 146 through a wired and/or wireless connection, such as, e.g., local WiFi, or the cloud.

The system may also include a computing device 136. The computing device 136 may be a computer, a laptop computer, a smartphone, and/or a tablet, among other examples not explicitly listed herein. As shown, in examples, the computing device 136 may include a processor 138, a memory 140, and a display 131. Moreover, the computing device 136 may be associated with a customer 142. In another, the barcode scanner 148 may be part of an application executed by the computing device 136.

It should be appreciated that the one or more price-calculation factors 120 assigned to the good 108 may be used to determine a first price 132 of the good 108 and/or a second price 134 of the good 108. It should be appreciated that the first price 132 and the second price 134 of the good 108 may be reduced pricing for the good 108 or a calculated markdown price for the good 108.

In examples, each factor of the one or more price-calculation factors 120 may include: price-calculation factors associated with the shelf-state of the good 108 and price-calculation factors associated with the future stock of the good 108. In general, each of the one or more price-calculation factors 120 include: a first expiration date of the good 108, a second expiration date of the good 108, the quantity of a particular good 108 in the store 110, a quantity of similar items from the same or a different seller, a seller's inventory, a sale strength of a brand associated with the good 108, a catalog price listed for the good 108, a predetermined minimum price allowed for the good 108, a demographic area in which the good 108 is sold, a day of the week in which the good 108 is sold, any particularly significant days of sale for the good 108 (such as, e.g., holidays, days in which major events are taking place, etc.), an hour of the day in which the good 108 is sold, a stock protection of the good 108, a demand curve for the good 108, a system model for each good 108, sale elasticity factors for the good 108, whether certain goods are otherwise already discounted, whether the good 108 is packaged (and/or what type of packaging), the packaged quantity of the good 108, whether the good 108 has any competitors, the last price that was charged for the good 108, any rounding rules applicable for the good 108, whether there is an active advertising campaign for the good 108, the shelf state for the good 108, the price history of the good 108, and/or any other relevant price-calculation factors. It should be appreciated that the system described learns and updates with the demand curve for the good 108.

The first expiration date of the good 108 differs from the second expiration date of the good 108. According to an embodiment, any or all of the price-calculation factors 120 may be used for good 108. It should be appreciated that the one or more price-calculation factors 120 are continuously analyzed and/or assigned for one or more goods.

In examples, the barcode scanner 148 of the store is configured to scan the readable identification tag 128 affixed to the good 108. In other examples, the barcode scanner 148 of the application executed by the computing device 136 is configured to scan the readable identification tag 128 affixed to the good 108. In some examples, the already printed expiration date on the good 108 may be read using optical character recognition (OCR). Next, the pricing server 112 (or the master server) is then configured to query, dynamically and in real-time, the database 150 to identify, from the readable identification tag 128, the good 108 and the information 118 associated with the good 108.

The pricing server 112 is then configured to utilize the dynamic pricing engine 124 to apply the one or more algorithms 126 to the identified good 108. The one or more algorithms 126 may employ one or more branches of machine learning to modify a price of the good 108 according to observed current shopping patterns and previous historical shopping patterns of the good 108 to reduce food waste and optimize revenue for the store 110.

The one or more algorithms 126 are applied to the identified good 108 to calculate the first price 132 of the good 108 and modify the first price 132 of the good 108 to optimize a target function. More specifically, the optimization depends on external parameters, such as the one or more price-calculation factors 120 described herein. Moreover, the one or more algorithms 126 modify the first price 132 of the good 108 based on the historical data 122, which may include observed current shopping patterns at the store 110, as well as previous historical shopping patterns for the good 108 at the store 110.

It should be appreciated that different optional target functions may be used. In an example, the target function may be based on factors that include: waste associated with the good 108 during a first time period, revenue associated with the good 108 during the first time period, waste associated with the good 108 and other goods during the first time period, revenue associated with the good 108 and other goods during the first time period, and/or marginal profits associated with the good 108 during the first time period. In other examples, the target function during the first time period may additionally or alternatively be a function that depends on an amount of the good 108 consumed during the first time period.

It should be appreciated that the optimized first price 132 of the good 108 may be calculated before or at the time of sale. In examples, the pricing server 112 is further configured to transmit optimized pricing of the good 108 based on an expiration date of the good 108 to a system managing one or more displays in real-time such that the pricing per good 108 that is transmitted to the POS is aligned with the prices shown on the displays 130 for the same good 108. Such system may include a display server. It should be appreciated that, as disclosed herein, the term "price" includes all variations of pricing, such as an absolute price, a discount rate price, and an absolute price or a discount rate price for a variable weight product.

The display 130 may include: the electronic shelf label 106, a screen affixed to an entire width of a shelf in the store 110, the display 131 of the computing device 136, a sticker, and/or the display 130 associated with the POS terminal 146.

It should be appreciated that each of these displays mentioned (e.g., the electronic shelf label 106, the screen affixed to the entire width of the shelf in the store 110, the display 131 of the computing device 136, the sticker, and/or the display 130 associated with the POS terminal 146) may, in some examples, display multiple optimized pricing of the good 108 based on various expiration dates of the good 108, a non-discounted price of the good 108, and/or additional pricing for the good 108. For example, if the expiration date for the good 108 is tomorrow, the price of the good 108 may be $5. However, if the expiration date for the good 108 is in a week, the price of the good 108 may be higher at $7.

In preferred examples, the pricing server 112 is configured to transmit, dynamically and in real-time, different pricing for the good 108 based on the expiration date as defined by the one or more algorithms 126. In some examples, two or more prices may be presented for the good 108 per expiration date. In another preferred example, the pricing server 112 is configured to present two prices for the good 108. When the readable identification tag 128 is scanned, the pricing associated with the closer expiration date may be only presented via the display 130.

It should further be appreciated that different displays may also display different information. One or more of these expiration dates may be saved in various locations throughout the supply chain. Moreover, one or more of these displays may depict wording along with the pricing and the expiration dates of the good 108. For example, the display 130 associated with the POS terminal 146 may display the wording "You have saved $10 today," to portray to the customer 142 the amount of money saved during the transaction.

The dynamic pricing engine 124 of the pricing server 112 is configured to apply the one or more algorithms 126 to the identified good 108 to calculate the another price of the good 108 during a second time period. The dynamic pricing engine 124 of the pricing server 112 is also configured to modify the other price of the good 108 during the second time period to the optimize the target function. The optimization of the target function depends on the one or more price-calculation factors 120 described herein. In other examples, the target function during the second time period may be based on factors that include: waste associated with the good 108 during the second time period, revenue associated with the good 108 during the second time period, waste associated with the good 108 and other goods during the second time period, revenue associated with the good 108 and other goods during the second time period, and/or marginal profits associated with the good 108 during the second time period. In other examples, the target function during the second time period may additionally or alternatively be a function that depends on an amount of the good 108 consumed during the second time period.

It should be appreciated that the optimized price of the good 108 may be calculated before or at the time of sale. In examples, an optimized price of the good 108 during the first time period is greater than the optimized price of the good 108 during the second time period. Moreover, the second time period is closer to an expiration date of the good than the first time period. Generally, the closer the sale date of the good 108 is to the expiration date of the good 108, the lower the optimized price will be for the good 108.

However, there are exceptions to this generalization, and in some examples, a discount will not be associated with the good 108. For example, the second price of the good may be greater than the first price of the good even if the second time period is closer to an expiration date of the good than the first time period. Such may be the case where the good 108 is a fresh good that is replenished on the shelf in the store 110. This depicts the dynamic nature of the system described herein.

In examples, the one or more algorithms 126 may include a reinforcement learning algorithm, a deep learning algorithm, a machine learning algorithm, or a classic optimization algorithm, among other algorithms not explicitly listed herein. It should be appreciated that the one or more algorithms 126 may include ones not listed explicitly herein.

In a first example, the one or more algorithms 126 may include the reinforcement learning algorithm. The reinforcement learning algorithm depends on a simulated environment, such as an economical model of the store 110 selling the good 108. Parameters associated with the simulated environment may be deduced from the historical data 122 of the store 110 selling the good 108 and may include pricing and demand amounts for the good 108, as well as other store parameters and data. Moreover, in some examples, the reinforcement learning algorithm may be a Q-learning algorithm. In other examples, the reinforcement learning algorithm may be a genetic algorithm. However, it should be appreciated that the reinforcement learning algorithm is not limited to the algorithms explicitly listed herein and other algorithms are contemplated.

In a second example, the one or more algorithms 126 may include the deep learning algorithm or the machine learning algorithm. In this scenario, an output for the target function is a continuous demand forecast (e.g., regression) or is discrete (e.g., classification or regression). For a given point, the system is trained by having the historical data 122 split to demand amounts and prices related to those demand amounts, along with other parameters obtained, such as pricing history and stock levels. Then, the system may be trained with a deep learning structure, such as neural networks, a convolutional neural network developed for biomedical image segmentation (e.g., U-Net), embeddings, and/or auto-ML.

In a third example, the one or more algorithms 126 may include the classic optimization algorithm. Use of this algorithm may include selecting a set of prices over time (e.g., from the historical data 122), which optimize the target function according to the observed historical demands for those prices.

Figure 3:
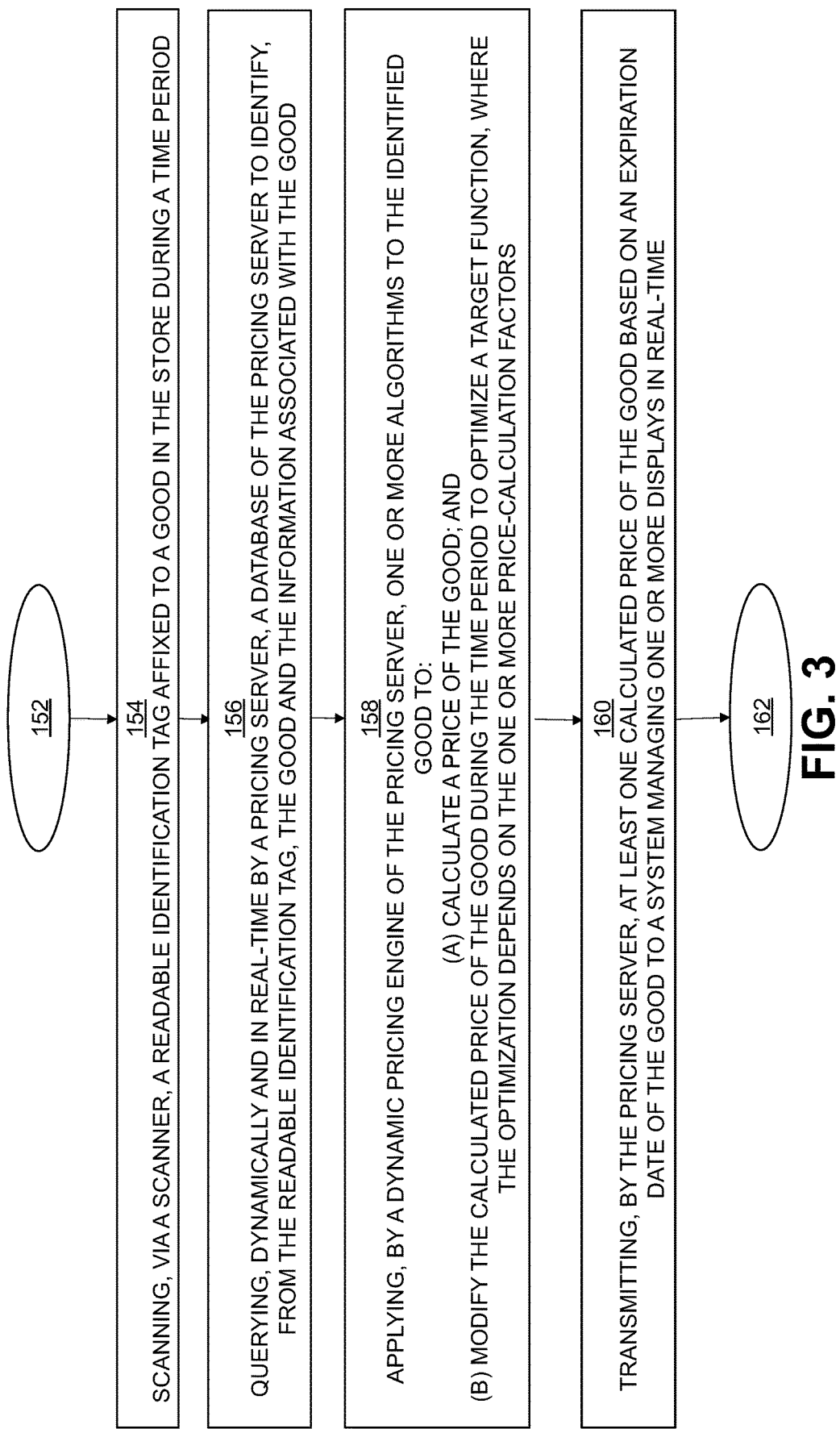
FIG. 3 depicts a block diagram of a flow chart for a method to reduce food waste and control pricing of goods in a retail setting, according to at least some embodiments disclosed herein.

A method for reducing food waste and controlling pricing of goods in a retail setting is also described and depicted in FIG. 3 herein. The method of FIG. 3 includes one or more process steps. Specifically, the method of FIG. 3 begins at a process step 152. The process step 152 is followed by a process step 154 that includes: scanning, via a scanner (such as the barcode scanner 148 connected to the POS terminal 146 in the store 110 or the scanner associated with an application executed on the computing device 136), the readable identification tag 128 affixed to the good 108 during a time period.

The process step 154 is followed by a process step 156 that includes: querying, dynamically and in real-time by the pricing server 112, the database 150 of the pricing server 112, to identify, from the readable identification tag 128, the good 108 and the information 118 associated with the good 108. The information 118 comprises one or more price-calculation factors 120 associated with a shelf-state of the good 108 and one or more price-calculation factors 120 associated with a future stock of the good 108.

The process step 156 is followed by a process step 158 that includes: applying, by the dynamic pricing engine 124 of the pricing server 112, the one or more algorithms 126 to the identified good 108 to: (a) calculate a price of the good 108 and (b) modify the calculated price of the good 108 during the time period to optimize a target function. The optimization of the target function depends on the one or more price-calculation factors 120 associated with the shelf-state of the good 108 and the one or more price-calculation factors 120 associated with the future stock of the good 108. It should be appreciated that the calculation of the price of the good 108 occurs periodically or continuously. In other examples, the calculation of the price of the good 108 occurs based on event driven updates for the price of the good 108.

Next, the process step 158 is followed by a process step 160 that includes: transmitting, by the pricing server 112, at least one calculated price of the good 108 (based on the expiration date of the good 108) to a system managing one or more displays 130 in real-time such that the pricing per good 108 that is transmitted to the POS is aligned with the prices shown on the displays 130 for the same good 108. Such system may include a display server. The display may include: the electronic shelf label 106, a screen affixed to an entire width of a shelf in the store 110, the display 131 of the computing device 136, a sticker, and/or the display 130 associated with the POS terminal 146. The pricing server 112 may also transmit a non-discounted price of the good 108 and/or other pricing based on the expiration date of the good 108 to the system, as discussed herein. The process of transmitting these prices to the display occurs dynamically and in real-time or according to the store's 110 preferences. In other examples, the display of the pricing for the good 108 may occur in near-real time, may be triggered in response to an event, or may be scheduled by the store 110. A process step 162 may follow the process step 160 to end the method of FIG. 3.

However, an optional step may follow the process step 160 of the method of FIG. 3 and may include: calculating, by the pricing server 112, another price of the good 108 during a second time period and modifying, by the pricing server 112, the other price of the good 108 to optimize the target function. The optimization of the target function depends on the one or more price-calculation factors 120 in the database 150.

In some examples, a first price of the good 108 is greater than a second price of the good 108 when the second time period is closer to an expiration date of the good than the first time period. In other examples, the a first price of the good 108 is less than a second price of the good 108 even though the second time period is closer to an expiration date of the good than the first time period. The process step 162 may follow this optional step to conclude the method of FIG. 3.

It should be appreciated that the calculations described herein in reference to FIG. 3 do not begin at the process step 154 and such calculations occur continuously and iteratively in the background. According to such process, the dynamic pricing engine 124 collects, fetches, calculates, stores, analyzes, and executes various operations to support the goal to set the optimal price for the good 108 at any point in time since different datasets are continuously streamed to the dynamic pricing engine 124 sporadically or at irregular intervals. These datasets may include, but are not limited to: seel-in/inventory datasets, sellout/sales datasets, weather datasets, and/or promotion datasets, among others.

As such, when the readable identification tag 128 is scanned in the process step 154, the pricing for the good 108 associated with the readable identification tag 128 is already set and has been previously defined. As such, the calculation of the pricing of the good 108 is not a single operation that is executed during customer checkout.

Figure 4:
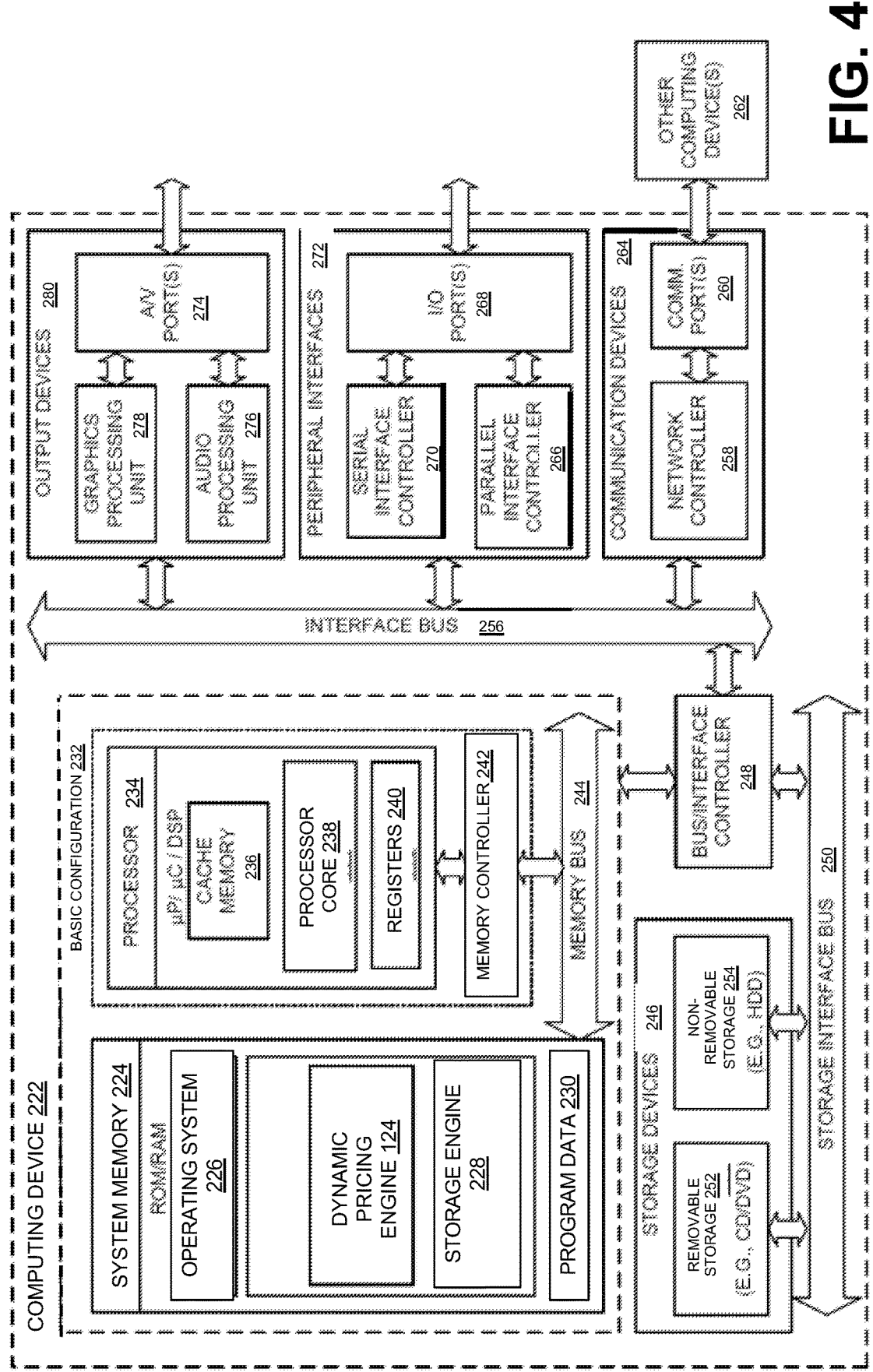
FIG. 4 depicts a block diagram of a computing device, according to at least some embodiments disclosed herein.

As explained supra, the pricing server 112 may be a computing device. FIG. 4 depicts a block diagram of the various components of such computing device included within the system of FIG. 1 or FIG. 2.

In some embodiments, the present invention may be a computer system, a method, a pricing server 112, and/or a computing device 222 (of FIG. 4). For example, the pricing server 112, and/or the computing device 222 may be utilized to implement a method for determining a price of goods, reducing food waste, optimizing markdowns for the goods, and controlling prices of the goods in a retail setting.

A basic configuration 232 of a computing device 222 is illustrated in FIG. 4 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as a dynamic pricing engine 124, and program data 230. In some embodiments, the dynamic pricing engine 124 may be an application, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps for determining a price of goods, reducing food waste, optimizing markdowns for the goods, and controlling prices of the goods in a retail setting. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for optimizing pricing of goods to achieve greater revenue while reducing waste in a retail setting, the system comprising:
   a good;
   a readable identification tag affixed to a good;
   a server comprising:
      a dynamic pricing engine comprising one or more algorithms;
      a memory;
      a processor; and
      a database configured to store information associated with the good, wherein the information comprises one or more price-calculation factors associated with a shelf-state of the good and one or more price-calculation factors associated with a future stock of the good;
   the dynamic pricing engine being configured to:
      query, dynamically and in real-time, the database to identify information associated with the good;
      dynamically access the one or more price-calculation factors associated with the shelf-state of the good and the one or more price-calculation factors associated with the future stock of the good;
      apply the one or more algorithms to the identified good to:
         calculate a first price of the good during a first time period;
         modify the calculated price of the good during the first time period to optimize a target function, wherein the optimization depends on the one or more price-calculation factors associated with the shelf-state of the good and the one or more price-calculation factors associated with the future stock of the good;
         calculate a second price of the good during a second time period; and
         modify the calculated price of the second good during the second time period to optimize the target function, wherein the optimization depends on the one or more price-calculation factors associated with the shelf-state of the good and the one or more price-calculation factors associated with the future stock of the good, wherein the first price of the good is equal or greater than the second price of the good determined since the second time period is closer to an expiration date of the good than the first time period; and
      store the price of the good in the memory; and
   during checkout, a barcode scanner connected to a point-of-sale (POS) terminal in a store is configured to scan the readable identification tag affixed to the good, wherein the POS terminal is connected to the server;

the processor is configured to:
   access information associated with the readable identification tag stored in the memory; and
   determine an identity of the good associated with the readable identification tag and its current price; and the server is configured to transmit the identity of the good associated with the readable identification tag and its current price to another system managing one or more displays in real-time.

2. The system of claim 1, wherein the readable identification tag is selected from the group consisting of: a Radio-Frequency Identification (RFID) tag, a barcode, a matrix barcode, and a data-enabled barcode.

3. The system of claim 1, wherein each of the one or more displays is selected from the group consisting of: an electronic shelf-label, a screen affixed to an entire width of a shelf, a display of a mobile device, a sticker, and a display associated with the POS terminal.

4. The system of claim 1, wherein the server further configured to transmit a non-discounted price of the good to a display of the one or more displays.

5. The system of claim 1, wherein the dynamic pricing engine is further configured to:
   identify a future change in the shelf-state of the good; and
   apply the one or more algorithms to the identified good to:
      calculate a third price of the good during a third time period; and
      modify the calculated price of the good during the third time period to optimize a target function, wherein the optimization depends on the one or more price-calculation factors associated with the shelf-state of the good and the one or more price-calculation factors associated with the future stock of the good.

6. A system for optimizing pricing of goods to achieve greater revenue while reducing waste, the system comprising:
   a good;
   a readable identification tag affixed to a good;
   a server comprising:
      a dynamic pricing engine comprising one or more algorithms;
      a memory;
      a processor; and
      a database configured to store information associated with the good, wherein the information comprises one or more price-calculation factors associated with a shelf-state of the good and one or more price-calculation factors associated with a future stock of the good;
   the dynamic pricing engine being configured to:
      query, dynamically and in real-time, the database to identify the information associated with the good;
      dynamically access the one or more price-calculation factors associated with the shelf-state of the good and the one or more price-calculation factors associated with the future stock of the good;
      apply the one or more algorithms to the identified good to:
         calculate a first price of the good during a first time period;
         modify the calculated price of the good during the first time period to optimize a target function, wherein the optimization depends on the one or more price-calculation factors associated with the shelf-state of the good and the one or more price-calculation factors associated with the future stock of the good;
         calculate a second price of the good during a second time period; and
         modify the calculated price of the second good during the second time period to optimize the target function, wherein the optimization depends on the one or more price-calculation factors associated with the shelf-state of the good and the one or more price-calculation factors associated with the future stock of the good, wherein the first price of the good is equal or greater than the second price of the good determined since the second time period is closer to an expiration date of the good than the first time period; and
      store the price of the good in the memory; and
   during checkout,
      a barcode scanner connected to a point-of-sale (POS) terminal in a store is configured to scan the readable identification tag affixed to the good, wherein the POS terminal is connected to the server;
      the processor is configured to:
         access information associated with the readable identification tag stored in the memory; and
         determine an identity of the good associated with the readable identification tag and its current price; and
      the server is configured to transmit the identity of the good associated with the readable identification tag and its current price to another system managing one or more displays in real-time, wherein each of the one or more displays is selected from the group consisting of: an electronic shelf-label, a screen affixed to an entire width of a shelf, a display of a mobile device, a sticker, and a display associated with the POS terminal.

7. The system of claim 6, wherein the server is a virtual server, a cloud server, a cluster of servers, or a cluster of computers, and wherein the server is located in-store or in a POS datacenter.

8. The system of claim 6, wherein the algorithm is selected from the group consisting of: a reinforcement learning algorithm, a deep learning algorithm, a machine learning algorithm, and a classic optimization algorithm, and wherein the machine learning algorithm that runs the dynamic pricing depends on factors that initially are based on a simulated environment.

9. The system in claim 6, wherein at least one display of the one or more displays is configured to present, by the server, two prices of the good simultaneously, and wherein each of the two prices of the good are associated with a different expiration date.

10. The system in claim 6, wherein at least one display of the one or more displays is configured to present, dynamically and in real-time by the server, different pricing for the good per expiration date as defined by the one or more algorithms.

11. The system in claim 6, wherein at least one display of the one or more displays is configured to present, dynamically and in real-time by the server, at least two prices for the good per expiration date as defined by the one or more algorithms.

12. The system of claim 6, wherein the target function is based on factors selected from the group consisting of: waste associated with the good during the first time period or the second time period, revenue associated with the good during the first time period or the second time period, waste associated with the good and other goods during the first time period or the second time period, revenue associated with the good and other goods during the first time period or the second time period, and marginal profits associated with the good during the first time period or the second time period.

13. A method for optimizing pricing of goods to achieve greater revenue while reducing waste, the method comprising:
   querying, dynamically and in real-time by a server, a database of the server to identify information associated with a good,
      wherein the information comprises one or more price-calculation factors associated with a shelf-state of the good and one or more price-calculation factors associated with a future stock of the good,
      wherein the server comprises a dynamic pricing engine, and
      wherein the dynamic pricing engine comprises one or more algorithms;
   dynamically accessing, by the dynamic pricing engine, the one or more price-calculation factors associated with the shelf-state of the good and the one or more price-calculation factors associated with the future stock of the good;
   applying, by the dynamic pricing engine, the one or more algorithms to the identified good to:
      calculate a first price of the good during a first time period;
      modify the calculated price of the good during the first time period to optimize a target function, wherein the optimization depends on the one or more price-calculation factors associated with the shelf-state of the good and the one or more price-calculation factors associated with the future stock of the good;
      calculate a second price of the good during a second time period; and
      modify the calculated price of the second good during the second time period to optimize the target function, wherein the optimization depends on the one or more price-calculation factors associated with the shelf-state of the good and the one or more price-calculation factors associated with the future stock of the good, wherein the first price of the good is equal or greater than the second price of the good determined since the second time period is closer to an expiration date of the good than the first time period; and
   soring, by a memory of the server, the price of the good; and
   during checkout,
      scanning, by a barcode scanner connected to a point-of-sale (POS) terminal in a store, the readable identification tag affixed to the good, wherein the POS terminal is connected to the server;
      accessing, by a processor of the server, information associated with the readable identification tag stored in the memory of the server; and
      determining, by the processor of the server, an identity of the good associated with the readable identification tag and its current price; and
      transmitting, by the server, the identity of the good associated with the readable identification tag and its current price to another system managing one or more displays in real-time.

14. The method of claim 13, further comprising:
   transmitting, by the server, a non-discounted price of the good to at least one display of the one or more displays.

15. The method of claim 13, wherein at least one display of the one or more displays is configured to present, dynamically and in real-time by the server, different pricing for the good per expiration date as defined by the one or more algorithms.

16. A system for optimizing pricing of goods to achieve greater revenue while reducing waste, the system comprising:
   a good;
   a readable identification tag affixed to a good;
   a computing device comprising an application, wherein the application comprises a dynamic pricing engine, and wherein the dynamic pricing engine comprises one or more algorithms; and
   a database configured to store information associated with the good, wherein the information comprises one or more price-calculation factors associated with a shelf-state of the good and one or more price-calculation factors associated with a future stock of the good;
   the dynamic pricing engine being configured to:
      query, dynamically and in real-time, the database to identify the information associated with the good;
      dynamically access the one or more price-calculation factors associated with the shelf-state of the good and the one or more price-calculation factors associated with the future stock of the good;
      apply the one or more algorithms to the identified good to:
         calculate a first price of the good during a first time period;
         modify the calculated price of the good during the first time period to optimize a target function, wherein the optimization depends on the one or more price-calculation factors associated with the shelf-state of the good and the one or more price-calculation factors associated with the future stock of the good;
         calculate a second price of the good during a second time period; and
         modify the calculated price of the second good during the second time period to optimize the target function, wherein the optimization depends on the one or more price-calculation factors associated with the shelf-state of the good and the one or more price-calculation factors associated with the future stock of the good; and
      store the price of the good in the database; and
   during checkout,
      a barcode scanner connected to a point-of-sale (POS) terminal in a store is configured to scan the readable identification tag affixed to the good, wherein the POS terminal is connected to the computing device; and
      the dynamic pricing engine is configured to:
         access information associated with the readable identification tag stored in the database;
         determine an identity of the good associated with the readable identification tag and its current price; and
         transmit the identity of the good associated with the readable identification tag and its current price to a display in real-time.

17. The system of claim 16, wherein the display is located in proximity to the good.

18. The system of claim 16, wherein the display is integral to the computing device or is connected to the computing device.

19. The system of claim 16, wherein the first price of the good is identical to the second price of the good.

20. The system of claim 16, wherein the first price of the good differs from the second price of the good.

21. A system for optimizing pricing of goods to achieve greater revenue while reducing waste, the system comprising:
a good;
a readable identification tag affixed to a good;
a computing device comprising an application, wherein the application comprises a dynamic pricing engine, and wherein the dynamic pricing engine comprises one or more algorithms; and
a database configured to store information associated with the good, wherein the information comprises one or more price-calculation factors associated with a shelf-state of the good and one or more price-calculation factors associated with a future stock of the good;
the dynamic pricing engine being configured to:
query, dynamically and in real-time, the database to identify the information associated with the good;
dynamically access the one or more price-calculation factors associated with the shelf-state of the good and the one or more price-calculation factors associated with the future stock of the good;
apply the one or more algorithms to the identified good to:
calculate a first price of the good during a first time period;
modify the calculated price of the good during the first time period to optimize a target function, wherein the optimization depends on the one or more price-calculation factors associated with the shelf-state of the good and the one or more price-calculation factors associated with the future stock of the good;
calculate a second price of the good during a second time period; and
modify the calculated price of the second good during the second time period to optimize the target function, wherein the optimization depends on the one or more price-calculation factors associated with the shelf-state of the good and the one or more price-calculation factors associated with the future stock of the good; and
store the price of the good in the database; and
during checkout,
a barcode scanner connected to a point-of-sale (POS) terminal in a store is configured to scan the readable identification tag affixed to the good, wherein the POS terminal is connected to the computing device;
the dynamic pricing engine is configured to:
access information associated with the readable identification tag stored in the database;
determine an identity of the good associated with the readable identification tag and its current price; and
transmit the identity of the good associated with the readable identification tag and its current price to a display in real-time, wherein the display is configured to present two prices of the good simultaneously, and wherein each of the two prices of the good are associated with a different expiration date.

* * * * *